(12) United States Patent
Zhou et al.

(10) Patent No.: US 9,399,407 B2
(45) Date of Patent: Jul. 26, 2016

(54) VEHICLE PROPULSION SYSTEM HAVING AN ENERGY STORAGE SYSTEM AND OPTIMIZED METHOD OF CONTROLLING OPERATION THEREOF

(71) Applicant: General Electric Company, Schenectady, NY (US)

(72) Inventors: Jian Zhou, Shanghai (CN); Zhi Zhou, Selkirk, NY (US); Robert Dean King, Schenectady, NY (US); Fengcheng Sun, Shanghai (CN); Zhihao Li, Rexford, NY (US)

(*) Notice: Subject to any disclaimer, the term of this patent is extended or adjusted under 35 U.S.C. 154(b) by 0 days.

(21) Appl. No.: 14/462,792

(22) Filed: Aug. 19, 2014

(65) Prior Publication Data
US 2016/0052423 A1   Feb. 25, 2016

(51) Int. Cl.
*B60L 15/06*    (2006.01)
*B60L 15/20*    (2006.01)
(Continued)

(52) U.S. Cl.
CPC ............... *B60L 15/2045* (2013.01); *B60L 3/12* (2013.01); *B60L 11/12* (2013.01); *B60L 11/1803* (2013.01); *B60L 11/1868* (2013.01); *B60L 15/06* (2013.01); *B60W 10/08* (2013.01); *B60W 10/26* (2013.01); *B60W 20/11* (2016.01); *H02P 5/00* (2013.01); *B60L 2210/12* (2013.01); *B60L 2210/14* (2013.01); *B60L 2210/40* (2013.01); *B60L 2220/42* (2013.01); *B60L 2240/421* (2013.01);
(Continued)

(58) Field of Classification Search
CPC .. B60L 15/2045; B60L 11/1803; B60L 15/06

USPC ......................................................... 701/22
See application file for complete search history.

(56) References Cited

U.S. PATENT DOCUMENTS

| | | |
|---|---|---|
| 5,218,283 A | 6/1993 | Wills et al. |
| 5,373,195 A | 12/1994 | De Doncker et al. |

(Continued)

FOREIGN PATENT DOCUMENTS

| | | |
|---|---|---|
| EP | 2556988 A2 | 2/2013 |
| EP | 2733008 A1 | 5/2014 |
| EP | 2738908 A1 | 6/2014 |

OTHER PUBLICATIONS

Williamson et al., "Comprehensive Drive Train Efficiency Analysis of Hybrid Electric and Fuel Cell Vehicles Based on Motor-Controller Efficiency Modeling", IEEE Transactions on Power Electronics, vol. 21, No. 3, May 2006.*

(Continued)

*Primary Examiner* — Mussa A Shaawat
*Assistant Examiner* — Yazan A Soofi
(74) *Attorney, Agent, or Firm* — Meagher Emanuel Laks Goldberg & Liao, LLP (57) ABSTRACT

A vehicle propulsion system includes a first bi-directional DC-DC converter coupled to a first DC bus, an energy storage system comprising at least one energy storage unit coupled to the first bi-directional DC-DC converter, a first DC-to-AC inverter coupled to the first DC bus, and a first electromechanical device coupled to the first DC-to-AC inverter. A controller is programmed to determine a real-time operating speed of the first electromechanical device, compare the real-time operating speed of the first electromechanical device to a scheduled speed of the first electromechanical device, and selectively control the first bi-directional DC-DC converter to shift a voltage of the first DC bus based on the comparison.

20 Claims, 7 Drawing Sheets

(51) Int. Cl.
  *B60L 3/12* (2006.01)
  *B60L 11/12* (2006.01)
  *B60L 11/18* (2006.01)
  *B60W 10/08* (2006.01)
  *B60W 10/26* (2006.01)
  *H02P 5/00* (2016.01)

(52) U.S. Cl.
  CPC ...... *B60L 2240/423* (2013.01); *B60L 2240/527* (2013.01); *B60L 2260/42* (2013.01)

(56) References Cited

U.S. PATENT DOCUMENTS

| | | | |
|---|---|---|---|
| 6,044,922 | A | 4/2000 | Field |
| 6,592,484 | B1 | 7/2003 | Tsai et al. |
| 7,259,533 | B2 | 8/2007 | Yang et al. |
| 7,308,958 | B2 | 12/2007 | Tamor et al. |
| 7,701,156 | B2 | 4/2010 | Okamura |
| 8,024,082 | B2 | 9/2011 | Richter et al. |
| 8,086,364 | B2 | 12/2011 | Xue et al. |
| 8,359,124 | B2 | 1/2013 | Zhou et al. |
| 8,370,007 | B2 * | 2/2013 | Brooks ............... B61L 3/006 180/170 |
| 8,525,468 | B2 | 9/2013 | Winterhalter et al. |
| 8,626,368 | B2 | 1/2014 | Hendrickson et al. |
| 8,994,327 | B2 | 3/2015 | Kusch et al. |
| 2004/0020697 | A1 | 2/2004 | Field |
| 2005/0040789 | A1 | 2/2005 | Salasoo et al. |
| 2007/0158118 | A1 | 7/2007 | King |
| 2011/0011659 | A1 | 1/2011 | Sailor et al. |
| 2012/0041625 | A1 | 2/2012 | Kelty et al. |
| 2012/0130891 | A1 | 5/2012 | Bogaard et al. |
| 2012/0200256 | A1 | 8/2012 | Tse |
| 2013/0016537 | A1 | 1/2013 | Deng |
| 2013/0138279 | A1 | 5/2013 | Shi et al. |
| 2013/0147404 | A1 | 6/2013 | Kim et al. |
| 2013/0218383 | A1 | 8/2013 | Martin |
| 2013/0234664 | A1 | 9/2013 | Marus et al. |
| 2013/0328393 | A1 * | 12/2013 | Bullock ............... B60K 6/46 307/10.1 |
| 2014/0077737 | A1 | 3/2014 | Zhang et al. |
| 2014/0145850 | A1 * | 5/2014 | Houle ............... G08B 21/182 340/606 |
| 2014/0266038 | A1 | 9/2014 | Gibeau et al. |
| 2015/0266386 | A1 | 9/2015 | Matsuda et al. |

OTHER PUBLICATIONS

Williamson et al., "Comprehensive Drive Train Efficiency Analysis of Hybrid Electric and Fuel Cell Vehicles Based on Motor-Controller Efficiency Modeling," IEEE Transactions on Power Electronics, vol. 21, No. 3, May 2006, pp. 730-740.
US Non-Final Rejection issued in connection with related U.S. Appl. No. 14/462,765 on Nov. 16, 2015.
US Non-Final Rejection issued in connection with related U.S. Appl. No. 14/479,937 on Nov. 19, 2015.
Non-Final Rejection towards related U.S. Appl. No. 14/480,002 dated Dec. 31, 2015.
European Search Report and Written Opinion issued in connection with related EP Application No. 15181274.0/1807 dated Jan. 8, 2016.
European Search Report and Written Opinion issued in connection with corresponding EP Application No. 15181296.3-1807 dated Jan. 8, 2016.
U.S. Appl. No. 14/480,002, filed Sep. 8, 2014, Zhou.
U.S. Appl. No. 14/479,937, filed Sep. 8, 2014, Zhou.
U.S. Appl. No. 14/462,765, filed Aug. 19, 2014, Zhou et al.
US Final Rejection issued in connection with related U.S. Appl. No. 14/479,937 on Apr. 6, 2016.
US Final Rejection issued in connection with related U.S. Appl. No. 14/462,765 on Apr. 7, 2016.
US Final Rejection issued in connection with related U.S. Appl. No. 14/480,002 on Apr. 15, 2016.

* cited by examiner

VEHICLE PROPULSION SYSTEM HAVING AN ENERGY STORAGE SYSTEM AND OPTIMIZED METHOD OF CONTROLLING OPERATION THEREOF

BACKGROUND OF THE INVENTION

Embodiments of the invention relate generally to electric drive systems for hybrid and electric vehicles and, more particularly, to a vehicle propulsion system for hybrid and electric vehicles with one or more energy storage devices and one or more electromechanical devices and an optimized method of controlling operation of the vehicle propulsion system.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration, with one or both the first and second sources being capable of being charged through regenerative braking.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

While propulsion system configurations for purely electric vehicles and hybrid electric vehicles have been developed to include multiple sources of electrical energy to increase energy or power density and multiple power sources to achieve desired propulsive output, incorporating these energy storage and power sources into a propulsion system increases the overall size, weight, and cost of the system. For example, to ensure a minimum level of performance will be maintained over the desired life of the vehicle, batteries are often oversized to reduce power and cyclic stresses. Also, overly aggressive thermal management controls are implemented to help reduce thermal stresses on the batteries. Both of these approaches increase the overall vehicle size, increase manufacturing costs, and increase the operating costs of the energy storage system.

Traditional energy storage units for hybrid and electric vehicles are designed and implemented with little control over the degradation rate of the energy storage units or batteries within the system. Known battery life prognosis is performed off-line using physics-based models to predict the rate of various individual degradation mechanisms. These experimental models may take into account solid-electrolyte interphase (SEI) resistance growth and capacity fade, chemical reaction paths for SEI growth, the onset of particle fracture due to high-rate charge/discharge, or the electrochemical state for a single duty-cycle of a battery. To date, however, known models do not predict the post-initiation crack propagation needed to correlate actual capacity fade with the experimental data and lack the predictive capability for arbitrary battery duty-cycles.

Further, the off-line life testing of battery technologies is typically performed in an accelerated manner that condenses many cycles into a much shorter period of time than the battery would experience during normal operation. As such, the empirical models developed using accelerated aging testing may not accurately account for the interactions between the calendar-related and cycling-related response of the battery in a real-time, real-world application.

In addition to the operation of energy storage units, the system efficiency of hybrid and electric power systems is also affected by the DC link voltage of the drive system. One known technique for determining the DC link voltage uses a comprehensive model to calculate a DC bus voltage that minimizes motor and inverter loss for a particular vehicle propulsion system configuration. Use of such a comprehensive model is time intensive and results in expensive hardware deployment. Moreover, such a method relies on the model's accuracy and is inevitably not robust to varying system components and operational modes. Another technique for determining a DC link voltage uses a motor system efficiency map to search for a voltage level with minimal loss. As this technique relies on a direct look-up table, noise on all input appears on the output voltage command. Moreover, the look-up table is static and does not take system dynamics into account. Thus, a sudden load change may cause unsatisfactory responsive performance on motor torque due to the latency of the voltage command. The comprehensive model likewise fails to respond satisfactorily to sudden load changes, typically adding a predetermined margin to the voltage command to accommodate any dynamic uncertainly. However, such a predetermined margin often produces an unsatisfactory response; since too large of a margin sacrifices system efficiency while too small of a margin will not meet the requested dynamic response.

As outlined above, known techniques for configuring a hybrid or electric propulsion system to operate with multiple energy storage sources and one or more power sources rely on experimentally determined models and static data that does not account for real-time, real-world system dynamics and operating conditions. Accordingly, use of these known techniques reduces the operating efficiency and fuel economy of the individual components of the propulsion system in addition to reducing the overall system efficiency.

Therefore, it would be desirable to provide an electric and/or hybrid electric propulsion system that improves overall system efficiency and optimizes the operation and lifespan of the energy storage units while permitting the prolusion system to be manufactured at a reduced cost.

BRIEF DESCRIPTION OF THE INVENTION

According to one aspect of the invention, a vehicle propulsion system includes a first bi-directional DC-DC converter coupled to a first DC bus, an energy storage system comprising at least one energy storage unit coupled to the first bi-directional DC-DC converter, a first DC-to-AC inverter coupled to the first DC bus, and a first electromechanical device coupled to the first DC-to-AC inverter. A controller is programmed to determine a real-time operating speed of the first electromechanical device, compare the real-time operating speed of the first electromechanical device to a scheduled speed of the first electromechanical device, and selectively control the first bi-directional DC-DC converter to shift a voltage of the first DC bus based on the comparison.

In accordance with another aspect of the invention, a method of manufacturing a vehicle propulsion system includes providing a DC-DC converter, coupling an energy storage system to the DC-DC converter, coupling the DC-DC voltage converter to a DC bus, and coupling a first DC-to-AC inverter to the DC bus. The method also includes coupling a first electromechanical device to the DC-to-AC inverter and coupling a controller to the DC-DC converter and to the first DC-to-AC inverter. Further, the method includes configuring the controller to monitor a real-time speed of the first electromechanical device, determine a scheduled speed of the first electromechanical device, calculate a difference between the scheduled speed and the real-time speed, and if the calculated difference exceeds a threshold, control the DC-DC converter to shift a voltage of the DC bus from a first voltage level to a second voltage level different from the first voltage.

In accordance with yet another aspect of the invention, a non-transitory computer readable storage medium has a computer program stored thereon and represents a set of instructions that when executed by a computer causes the computer to monitor a real-time speed of a first electromechanical device coupled to a DC bus through an DC-to-AC inverter and determine a scheduled speed of the first electromechanical device. The instructions also cause the computer to compare the real-time speed of the first electromechanical device to the scheduled speed of the first electromechanical device, control a bi-directional DC-DC converter to transfer power from an energy storage system to the DC bus, and control the bi-directional DC-DC converter to selectively adjust a voltage of the DC bus based on the comparison of the real-time speed of the first electromechanical device to the scheduled speed of the first electromechanical device.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
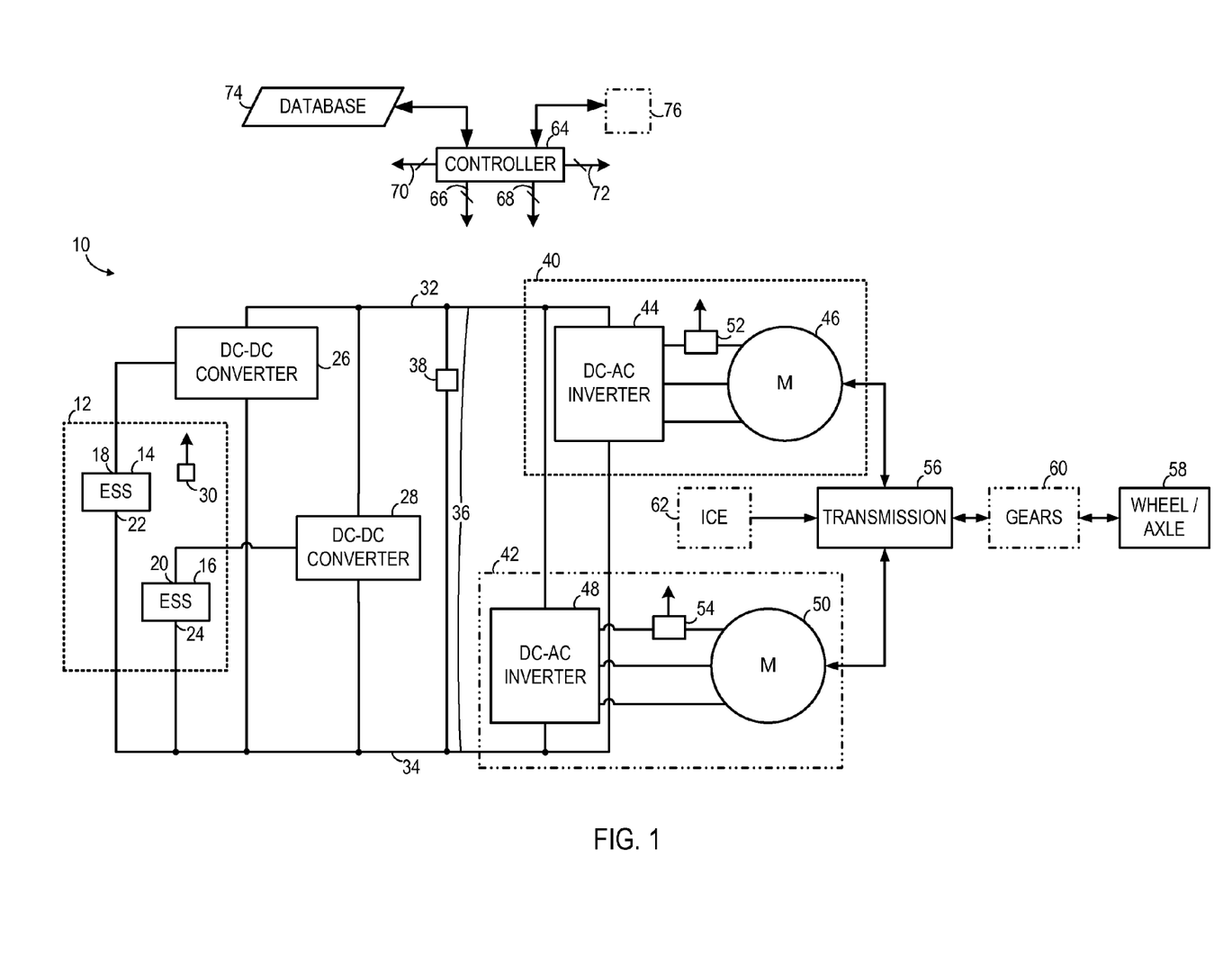
FIG. 1 is a schematic diagram of a vehicle propulsion system according to an embodiment of the invention.

FIG. 1 is a schematic diagram of a propulsion system 10 according to an embodiment of the invention. As described in detail below, propulsion system 10 may be configured in a pure electric (EV) propulsion system arrangement that splits power output between one or more electromechanical devices or as a hybrid (HEV) propulsion system that includes an internal combustion engine in addition to one or more electromechanical devices. In either an EV or HEV embodiment, the electromechanical devices are provided on a common DC bus or on an output port of independent channels of a multi-channel DC-DC converter, simplifying the electrical DC bus and cabling structure and saving cost while still permitting flexibility in the sizing and operation of the multiple electromechanical devices and increasing the operating efficiency of the electromechanical devices and overall propulsion system.

According to various embodiments, propulsion system 10 is configured to be incorporated into various types of vehicles including, but not limited to, automobiles, busses, trucks, tractors, commercial and industrial vehicles such as mining and construction equipment, marine craft, aircrafts and off-road vehicles, including material transport vehicles or personal carrier vehicles, capable of operation both on the surface and underground such as in mining operations, or other type of electrical apparatus such as, for example, a crane, elevator, or lift, as non-limiting examples.

Propulsion system 10 includes an energy storage system 12 having a first energy storage unit 14 and a second energy storage unit 16. Each energy storage unit 14, 16 have a positive terminal 18, 20 and a negative terminal 22, 24. Positive terminal 18 of first energy storage unit 14 is coupled to a first bi-directional DC-DC converter 26 and positive terminal 20 of second energy storage unit 16 is coupled to a second bi-directional DC-DC converter 28. Each of the first and second energy storage units 14, 16 has a separate or integrated energy storage management system (not shown), which may be configured as a battery management system (BMS) in an embodiment the respective energy storage unit is a battery. According to another embodiment, bi-directional DC-DC converters 26, 28 are bi-directional DC-DC voltage converters or bi-directional buck/boost voltage converters.

A sensor system 30 is provided within propulsion system 10 to monitor and calculate the state-of-charge (SOC) of the first and second energy storage units 14, 16. According to one embodiment, sensor system 30 includes voltage sensors and/or current sensors configured to measure the voltage and/or current of first and second energy storage units 14, 16 at various times during operation thereof.

According to various embodiments, first and second energy storage units 14, 16 each include one or more energy storage devices such as a battery, a flywheel, fuel cell, an ultracapacitor, or a combination of ultracapacitors, fuel cells, and/or batteries, as examples. In one embodiment, first energy storage unit 14 is a high specific-power energy storage device and second energy storage unit 16 is a high specific-energy storage device. For example, first energy storage unit 14 may be an ultracapacitor having multiple capacitor cells coupled to one another, where the capacitor cells may each have a capacitance that is greater than approximately 500 Farads. Alternatively, first energy storage unit 14 may be a high power battery having a specific-power of approximately 350 W/kg or greater or a combination of one or more ultracapacitors and batteries. In such an embodiment, second energy storage unit 16 has a relatively low specific power as compared with first energy storage unit 14. As used herein, low specific power describes an energy storage device demonstrated to achieve a specific power on the order of approximately 200 W/kg or lower. According to various embodiments, second energy storage unit 16 may be, for example, a high specific energy battery or high energy density battery. The term energy battery used herein describes a high specific energy battery demonstrated to achieve a specific energy on the order of 100 W-hr/kg or greater (e.g., a Li-ion, sodium-metal halide, sodium nickel chloride, sodium-sulfur, Li-Air, or zinc-air battery).

In one embodiment, second energy storage unit 16 has a relatively high resistivity and impedance as compared with first energy storage unit 14. In another embodiment, the relatively low specific power of second energy storage unit 16 may be due to an imbalance of the individual battery cells comprising the energy storage system. In one embodiment, second energy storage unit 16 is a low-cost lithium ion battery. Alternatively, second energy storage unit 16 may be a sodium metal halide battery, a sodium sulfur battery, a nickel metal hydride battery, a Zinc-air battery, a lead acid battery, and the like.

Propulsion system 10 also includes a first bi-directional DC-DC converter 26 and second bi-directional DC-DC converter 28 are coupled across the positive DC link 32 and the negative DC link 34 of a DC bus 36. A voltage sensor 38 is coupled across DC bus 36 to monitor a DC bus voltage. In another embodiment, sensor 38 is embedded in one of the DC-DC converters.

According to one embodiment, either or both of first and second energy storage units 14, 16 may be sized such that the respective bi-directional DC-DC converters 26, 28 may be omitted, resulting in a propulsion system 10 that includes fewer parts and less weight than a system that includes a respective DC-DC voltage converter for each energy storage system. In such an embodiment, a contactor (not shown) may be provided to selectively couple the respective energy storage unit to the DC bus.

Both first bi-directional DC-DC converter 26 and second bi-directional DC-DC converter 28, when used, are configured to convert one DC voltage to another DC voltage either by bucking or boosting the DC voltage. According to one embodiment, each bi-directional DC-DC converter 26, 28 includes an inductor coupled to a pair of electronic switches and coupled to a pair of diodes. Each switch is coupled to a respective diode, and each switch/diode pair forms a respective half phase module. Switches may be, for example, insulated gate bipolar transistors (IGBTs), metal oxide semiconductor field effect transistors (MOSFETs), silicon carbide (SiC) MOSFETs, Gallium nitride (GaN) devices, bipolar junction transistors (BJTs), and metal oxide semiconductor controlled thyristors (MCTs).

First and second energy storage units 14, 16 are coupled via DC bus 36 to a first load 40 and an optional second load 42 (shown in phantom). In one embodiment, first and second loads 40, 42 are electric drives. First load 40 includes a first DC-to-AC voltage inverter 44 and a first motor or first electromechanical device 46. Second load 42 includes a second DC-to-AC voltage inverter 48 and a second motor or second electromechanical device 50. In one embodiment, each inverter 44, 48 includes six half phase modules that are paired to form three phases, with each phase is coupled between the positive and negative DC links 32, 34 of the DC bus 36.

Each electromechanical device 46, 50 includes a plurality of windings coupled to respective phases of its respective DC-to-AC voltage inverter 44, 48. In one embodiment, electromechanical device 46 is a traction motor and electromechanical device 50 is either an alternator or a fraction motor. In another embodiment, electromechanical devices 46, 50 are AC motors. Sensor assemblies, generally indicated as part numbers 52 and 54 in FIG. 1, include various current and/or voltage sensors to monitor torque and speed of the respective electromechanical devices 46, 50.

Although the propulsion system 10 is described herein as including three-phase inverters 44, 48 and three-phase electromechanical devices 46, 50, it is contemplated that propulsion system 10 may utilize any number of phases in alternative embodiments.

Propulsion system 10 also includes a transmission 56 coupled to the outputs of first and second electromechanical devices 46, 50. Transmission 56 is constructed as a gear assembly, belt assembly, or combination thereof according to various embodiments. According to one embodiment, transmission 56 is configured as an electrically variable transmission (EVT) that couples the outputs of electromechanical devices 46, 50 through an arrangement of internal planetary gears and clutches (not shown). In operation, electromechanical devices 46, 50 may be operated over a wide range of bi-directional speed, torque, and power commands to minimize power loss and maintain a high degree of overall system efficiency while propulsion system 10 is operating in either a charge depleting (CD) or charge sustaining (CS) mode of operation.

The output of transmission 56 is coupled to one or more driving wheels 58 or axles of a vehicle through a gear assembly 60, which may include a differential. Depending on how the clutches of transmission 56 are configured, first or second electromechanical device 46, 50 may be coupled to gear assembly 60 through transmission 56 or may be directly coupled to gear assembly 60 such that the output of first or second electromechanical device 46, 50 bypasses transmission 56.

According to one embodiment propulsion system 10 is configured as a pure electric vehicle (EV) propulsion system. Alternatively, propulsion system 10 is configured in a hybrid electric vehicle (HEV) propulsion system and also includes an internal combustion engine (ICE) 62 (shown in phantom) coupled to transmission 56. According to various embodiments, internal combustion engine 62 may be an internal combustion gasoline engine, an internal combustion diesel engine, an internal combustion engine fueled by natural gas, an external combustion engine, or a gas turbine engine, as non-limiting examples.

Propulsion system 10 also includes a controller 64 operably coupled to first and second bi-directional DC-DC converters 26, 28 by control lines 66. Through appropriate control of the switches of first bi-directional DC-DC converter 26, controller 64 is configured to boost a voltage of first energy storage unit 14 to a higher voltage and to supply the higher voltage to the DC bus 36. Likewise, controller 64 is configured to control switching of second bi-directional DC-DC voltage converter 28 to boost the voltage of energy storage unit 16 to a higher voltage and to supply the higher voltage to the DC bus 36 during a motoring mode of operation. Controller 64 is also configured to control switching of first and second bi-directional DC-DC converters 26, 28 to buck a voltage of DC bus 36 and to supply the bucked voltage to the respective first or second energy storage unit 14, 16 during a charging or regenerative mode of operation. In one embodiment control lines 66 include a real or virtual communication data link that conveys the voltage commands to the respective bi-directional DC-DC converter 26, 28.

Controller 64 is also coupled to first DC-to-AC voltage inverter 44 and second DC-to-AC voltage inverter 48 through control lines 68. In a motoring mode, controller 64 is configured to control the half phase modules of first and second DC-to-AC voltage inverters 44, 48 to convert the DC voltage or current on DC bus 36 to an AC voltage or current for supply to the electromechanical devices 46, 50. When accelerating in the motoring mode, propulsion system 10 increases the speed of rotation of one or both of electromechanical devices 46, 50 from zero or from its real-time or current speed to a higher speed. In a regenerative mode, controller 64 is configured to control first and second DC-to-AC voltage inverters 44, 48 to invert an AC voltage or current received from its corresponding electromechanical device 46, 50 into a DC voltage or current to supply to DC bus 36.

During operation controller 64 also receives feedback from voltage sensor 38 via control lines 70 and from energy storage unit sensor system 30 via control lines 72. As one skilled in the art will recognize, additional voltage and/or current sensors may be provided throughout propulsion system 10 to permit controller 64 to monitor other operating conditions. In addition, one skilled in the art will recognize that controller 64 may receive feedback from and/or transmit control commands to other components within propulsion system 10, such as, for example, internal combustion engine 62.

While the energy storage system 12 of propulsion system 10 is described herein as including two energy storage units, it is contemplated that alternative embodiments may include a single energy storage unit coupled to a single DC-DC voltage converter assembly or three or more energy storage units either directly coupled to DC bus 36 or coupled to DC bus 36 via one of first and second bi-directional DC-DC converter 26, 28 or an additional DC-DC converter. In addition, alternative embodiments may include a single electromechanical device/DC-to-AC voltage inverter pair coupled to DC bus 36 or three or more electromechanical devices coupled to DC bus 36 via respective DC-to-AC voltage inverters.

According to one embodiment, propulsion system 10 includes a database 74 configured to store information related to the propulsion system 10. Such information may include, as examples, degradation models for energy storage units 14, 16, predefined voltage scheduling maps for the electromechanical devices 46, 50, and historical or known acceleration and deceleration periods of the vehicle along a known route or according to vehicle acceleration/deceleration trends or a predefined duty cycle. An optional vehicle position sensor 76 (shown in phantom) may be provided to determine a position of the vehicle along a route based on position identifiers such as mile markers, time of day, or global positioning system (GPS) location information, for example, with the vehicle position information being related to acceleration and deceleration events stored in database 74. Each acceleration and deceleration event in database 74 may also contain information regarding the time duration of an acceleration or deceleration event.

Figure 2:
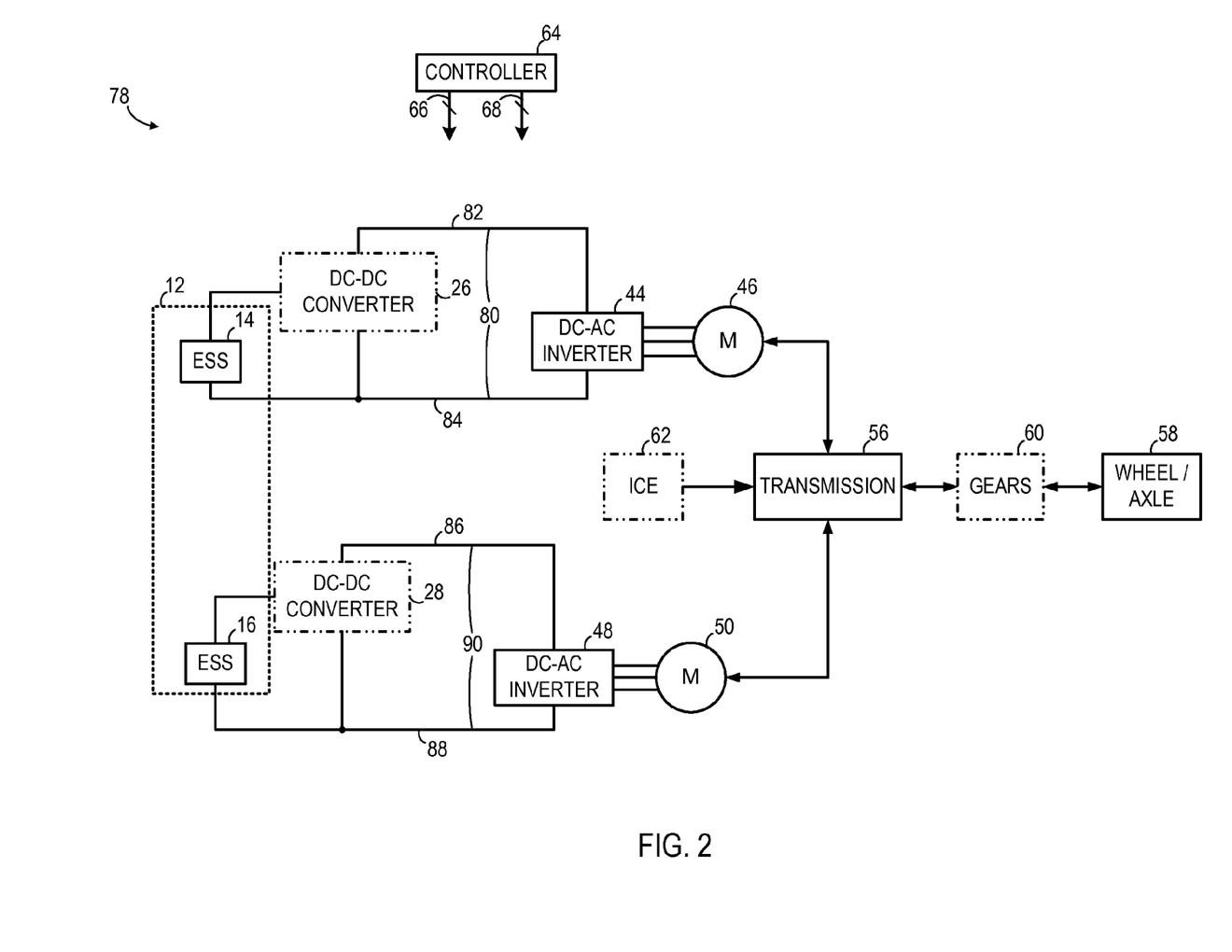
FIG. 2 is a schematic diagram of a vehicle propulsion system according to another embodiment of the invention.

Referring now to FIG. 2, a propulsion system 78 is illustrated according to an alternative embodiment. Similar to propulsion system 10, propulsion system 78 includes first and second electromechanical devices 46, 50 coupled to respective first and second DC-to-AC voltage inverters 44, 48. Other elements and components common to propulsion system 10 and propulsion system 78 are referred to herein with similar part numbering as appropriate.

As shown in FIG. 2, first DC-to-AC voltage inverter 44 is coupled to first energy storage unit 14 through a first DC bus 80 having a positive DC link 82 and a negative DC link 84. Likewise, second DC-to-AC voltage inverter 48 is coupled to second energy storage unit 16 through positive DC link 86 and negative DC link 88 of a second DC bus 90. Optionally, first and second bi-directional DC-DC converters 26, 28 (shown in phantom) may be coupled between energy storage units 14, 16 and DC-to-AC voltage inverters 44, 48 and operated via controller 64 to selectively boost the voltage of respective energy storage units 12, 16 to the bus voltage of the corresponding first or second DC bus 80, 90 during a motoring mode and buck the voltage of first or second DC bus 80, 90 to a voltage of respective energy storage unit 12, 16 during a regenerative or recharging mode.

In embodiments where either or both of the DC-DC converters 26, 28 are omitted from propulsion system 78, the overall system architecture is simplified and the weight and volume of the propulsion system 78 is reduced. However, the omission of these components from the system topology may result in lower efficiency and less flexibility of controls and optimization as a result of the loss of control of the voltage of the first and second DC buses 80, 90.

Because propulsion system 78 is configured with two independent DC busses 80, 90, the DC link voltage of each bus 80, 90 may be independently selected and controlled. In addition, the independent DC link voltages provides for greater flexibility in selecting and sizing the energy storage units 14, 16 and electromechanical devices 46, 50 for maximum system efficiency.

Figure 3:
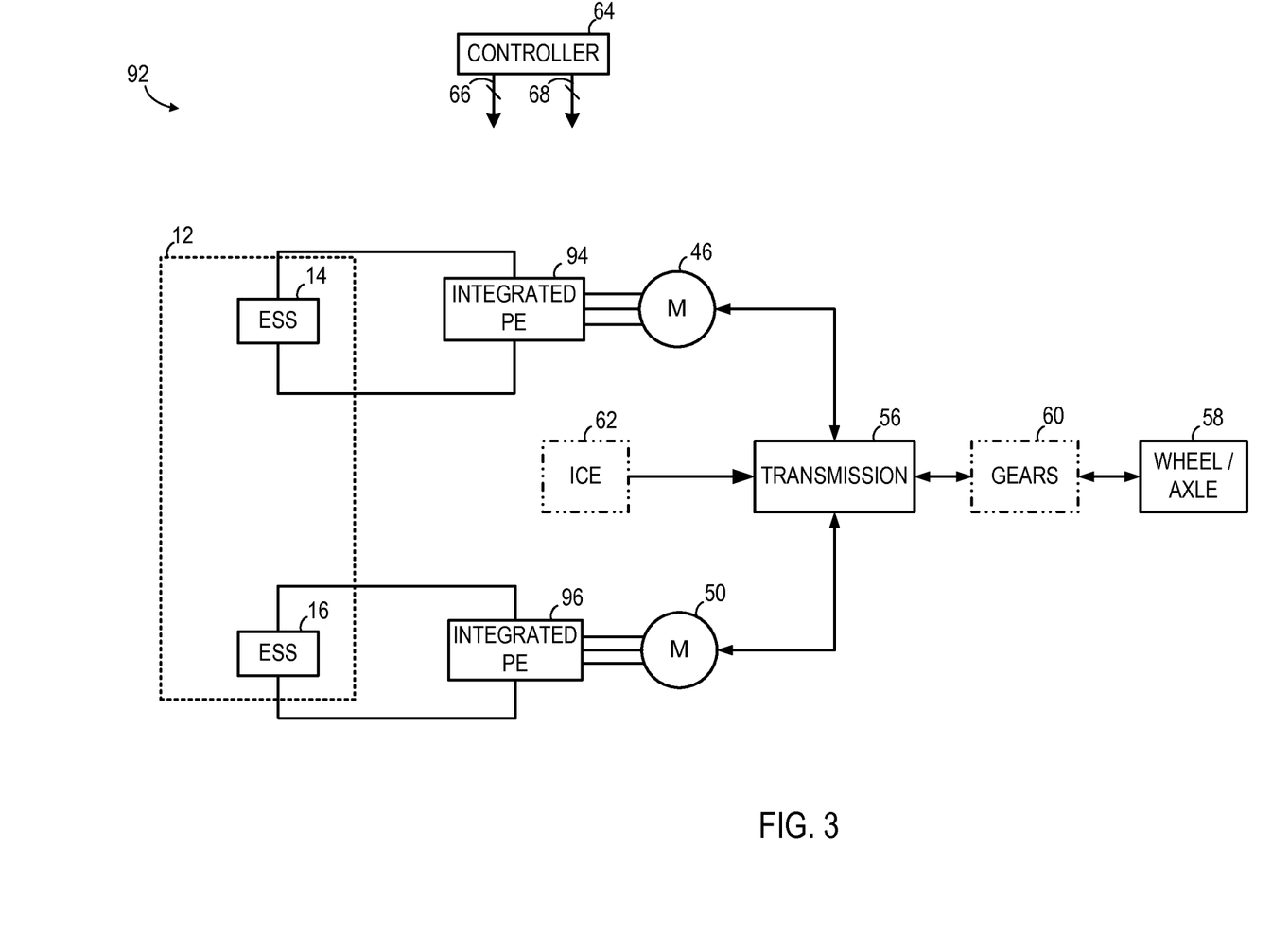
FIG. 3 is a schematic diagram of a vehicle propulsion system according to another embodiment of the invention.

FIG. 3 is a schematic diagram of a propulsion system 92 according to another embodiment of the invention. Elements and components common to propulsion systems 10, 78, and 92 are referred to relative to the same reference numbers as appropriate. Propulsion system 92 differs from propulsion systems 10, 78 in that first and second integrated power electronics assemblies 94, 96 replace the DC-DC voltage converter assemblies and DC-AC inverters of propulsion systems 10 and 78 (FIGS. 1 and 2). Each integrated power electronics assembly 94, 96 of FIG. 3 includes a DC-DC voltage converter and an DC-AC inverter combined within a common hardware packaging. Such an embodiment provides for more effective thermal management of the power electronics and a more compact design. However, repair costs for propulsion system 92 may be higher than those for propulsion systems 10, 78 because the voltage converter and inverter electronics are packaged in the same housing, the entire packaging assembly may need to be replaced when one component fails.

Figure 4:
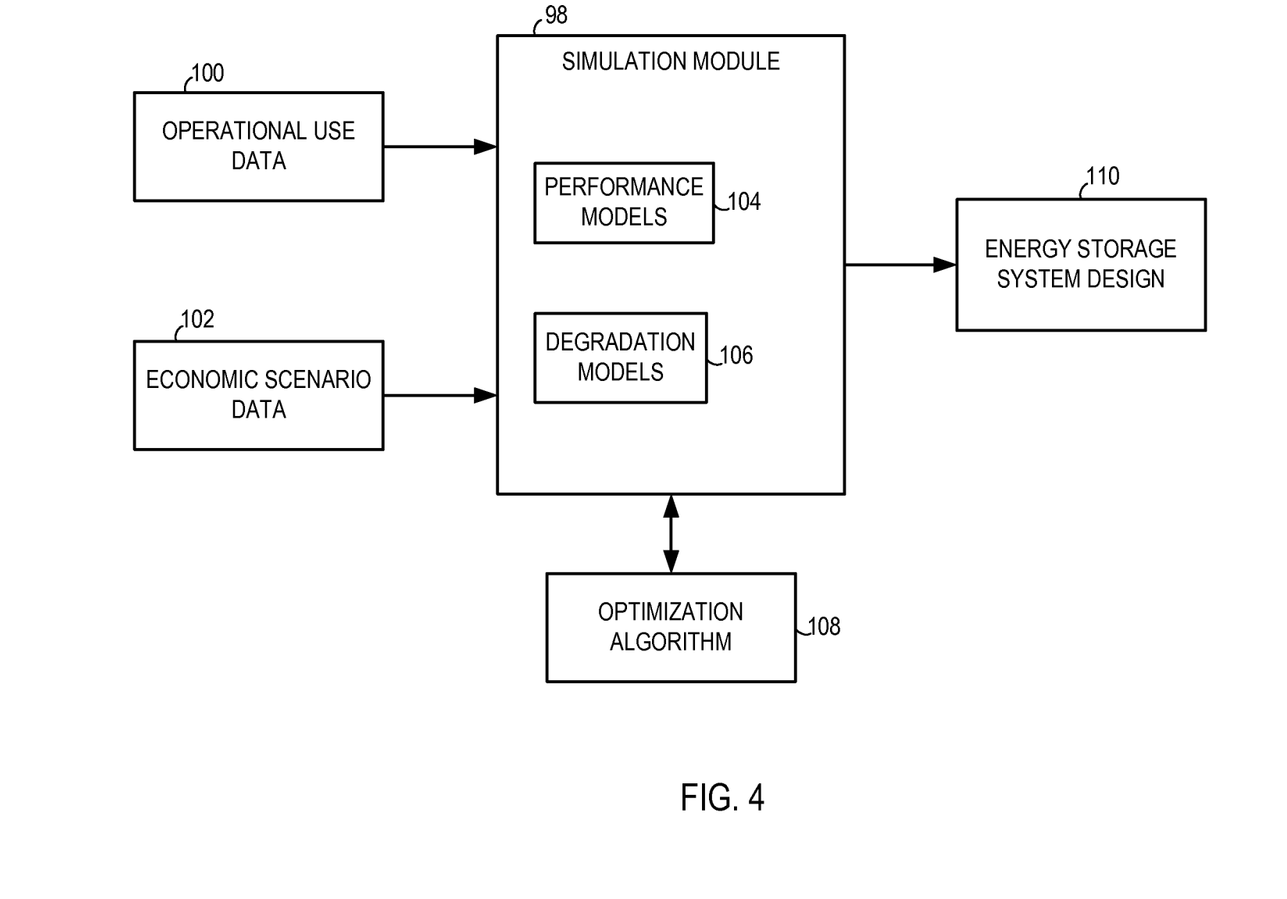
FIG. 4 is a schematic diagram of a simulation model for generating a design configuration of an energy storage system according to an embodiment of the invention.

The design configuration of the energy storage system 12 of FIGS. 1, 2, and 3 is determined using an energy storage system simulation module 98 schematically illustrated in FIG. 4. As described in detail below, simulation module 98 is operated offline and uses a collection of energy storage unit models, operational data, and economic data to define a configuration for an energy storage system that is capable of providing desired performance characteristics for propulsion system operation and that also minimizes the cost and sizing of the individual energy storage units within the energy storage system.

Simulation module 98 receives as an input operational use data 100 that includes data for a broad range of possible usage patterns for the individual energy storage units that may be included within energy storage system 12. Such operational use data 100 may include, for example, a selection of predetermined or standard duty or drive cycles, such as a city drive cycle and a highway drive cycle, which include details on how the power demand over the exemplary drive cycle varies. Simulation module 98 also receives economic scenario data 102 that includes parameters that account for variations in the initial capital costs of various types of energy storage units and vehicle operations costs including, for example, operating costs for vehicles incorporating different types of energy storage units and/or costs to recharge different types of energy storage units.

Provided within energy storage system simulation module 98 are physics-based models 104, such as, for example, electrochemical models, for various types of energy storage units that may be included within the energy storage system 12. Simulation module 98 also includes degradation models 106 of various types of energy storage units.

An optimization algorithm 108 is applied to the simulation module 98 to determine an optimized configuration for energy storage system 12, taking into account the physics-based models 104 and degradation models 106 of the various options for energy storage units, the operation use data 100, and economic scenario data 102 for the propulsion system.

The resulting output 110 of the simulation module 98 is a design for energy storage system 12 that includes a selection of the type of energy storage units within energy storage system 12, such as power batteries and/or energy batteries for example, and an optimized sizing of those energy storage units, which may include the power of each energy storage unit defined in kilowatts as well as the energy of each energy storage unit defined in kilowatt-hours. As one non-liming example, the output 110 of simulation module 98 may define an energy storage system 12 as including a 10 kW, 20 kW-hr power battery and a 10 kW, 50 kW-hr energy battery.

The energy storage system design output by simulation module 98 may be suitable for most, if not all, operational use and economic scenarios of the propulsion system. For example, a particular design could be stated to achieve 10 years of life for 85% of the customers, whereas another design option may achieve nine years of life for 95% of the customers.

Figure 5:
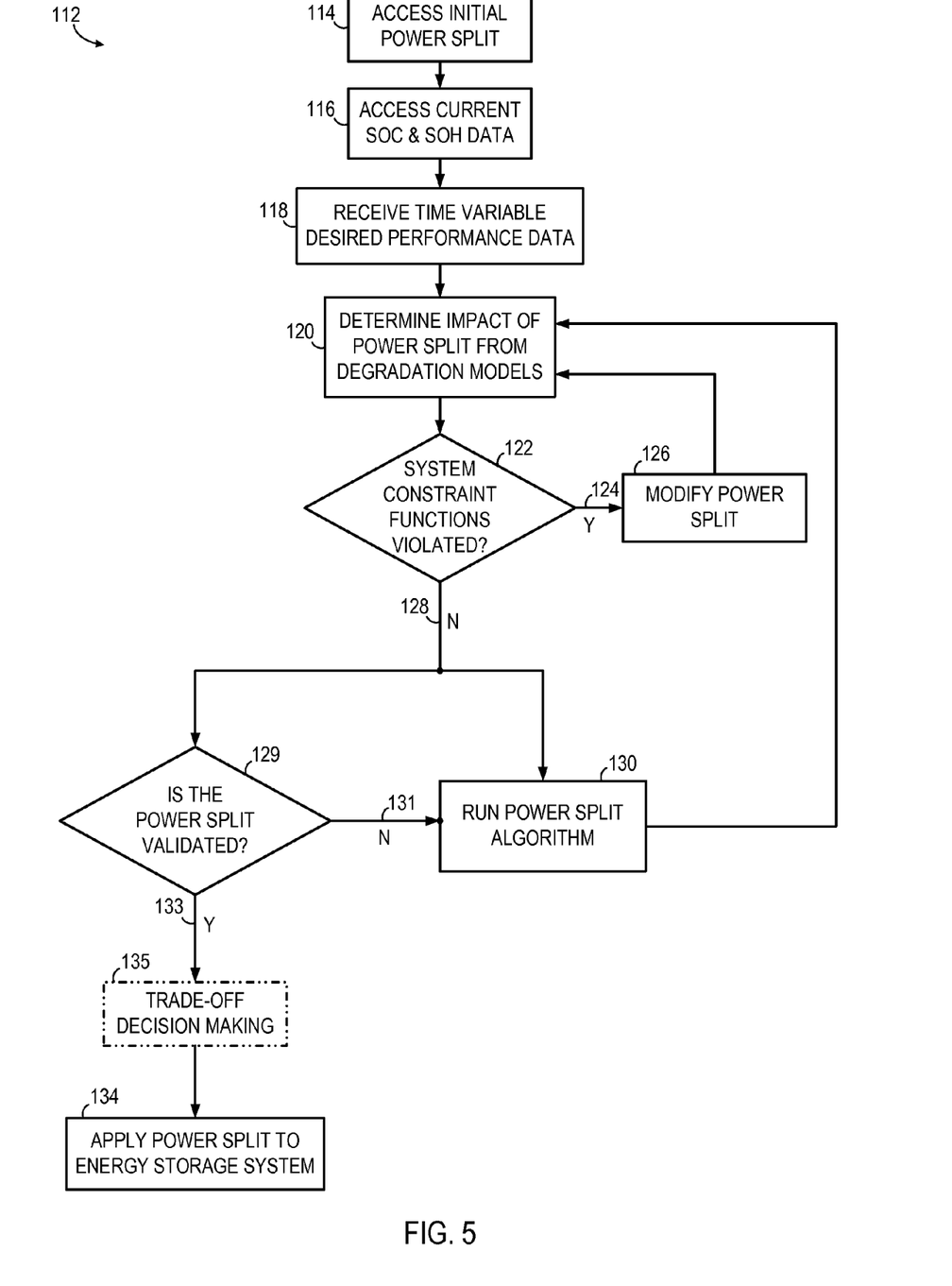
FIG. 5 illustrates a dynamic control technique for splitting a total power demand of a vehicle propulsion system between a plurality of energy storage units according to an embodiment of the invention.

In addition to providing an optimized design configuration for energy storage system 12 through the offline use of simulation module 98, embodiments of the invention also provide online optimization of energy storage system 12 through the operation of a dynamic power-split control technique 112 illustrated in FIG. 5, during which controller 64 selectively draws power from energy storage units 14, 16 according to a control strategy designed to optimize the power split among the energy storage units 14, 16 while maximizing the overall operating efficiency of propulsion system 10. The power-split control technique 112 is operated in real-time and effects a split of the total power demand for the propulsion system 10 between the energy storage units 14, 16 while considering a broad range of possible usage patterns for the energy storage units, degradation models for the energy storage units, awareness of possible future demands, and a power dispatch algorithm. While dynamic control technique 112 is described below with reference to propulsion system 10 of FIG. 1, it will be appreciated that technique 112 may readily to be extended to propulsion systems having alternative configurations, such as, for example, propulsion system 78 (FIG. 2) and propulsion system 92 (FIG. 3).

Dynamic power-split control technique 112 begins at step 114 by accessing an initial power split for the energy storage units 14, 16, which defines how the total power demand of the propulsion system 10 is to be divided between the energy storage units 14, 16 for a given operating period. At vehicle startup, the initial power split may be defined as a default value determined from a preset duty or drive cycle for propulsion system 10. In operation, the initial power split may be defined as the most recent power split applied to the energy storage units 14, 16.

At step 116, operating parameters for the first and second energy storage units 14, 16 are monitored. In one embodiment, the operating parameters include a real-time value of the state-of-charge (SOC) of the energy storage units 14, 16 and a real-time value state-of-health (SOH) of the energy storage units 14, 16. These real-time SOC and SOH values 116 may be determined from information received from energy storage unit sensor system 30. The SOC indicates a quantity or level of electrical energy stored in the energy storage units 14, 16 and may be determined by controller 64 using voltage and/or current measurements provided to controller 64 from sensor system 30. The SOH of the energy storage units 14, 16 refers to the ability of the energy storage units 14, 16 to meet rated performance during discharge (e.g., supplying a load) or during charge. The SOH may be determined from a variety of parameters. For example, where the energy storage units 14, 16 include one or more batteries, the SOH may be based on a battery terminal voltage as a function of current, an estimate of internal battery resistance, a battery temperature, a battery voltage at a given value of the SOC, and/or trends of battery resistance over the life or calendar age of a battery.

At step 118, the power-split control technique 112 receives time-variable desired vehicle performance data that reflects a real-time power demand from the propulsion system 10. Such time-variable desired vehicle performance data may be determined from a user input such as an acceleration or deceleration event, for example, or from information attained from a predetermined vehicle route or duty cycle, such as from information stored on database 74.

At step 120 the impact of operating energy storage units 14, 16 according to the power split is determined. Specifically, the time-variable desired performance data, initial power split, and real-time SOC and real-time SOH data is input to degradation models for the energy storage units 14, 16 at step 120. The degradation models 120 are used to determine a change in the state of health, $\Delta SOH$, for each energy storage unit 14, 16 as well as a change in the state of charge, $\Delta SOC$, for each energy storage unit 14, 16 based on the real-time SOC and SOH values 116 and the initial power split 114. At step 120, the degradation models are also used to determine the maximum power available from the first and second energy storage units 14, 16, which decreases over the life of the first and second energy storage units 14, 16.

At step 122, power-split control technique 112 determines whether operating the energy storage system 12 in accordance with the initial power split violates any system performance constraint functions. These system performance constraint functions may include functions that define certain thresholds for the propulsion system, such as a thermal limit, maximum power, maximum current, and/or maximum voltage, as examples.

If operation at the initial power split does violate a system performance constraint function 124, power-split control technique 112 modifies the power split between the first and second energy storage units 14, 16 at step 126 and then returns to step 120 to determine the impact of the modified power split from the degradation models. For example, if the initial power split assigned 30 percent of the total power demand to first energy storage unit 14 and the remaining 70 percent of the total power demand to second energy storage unit 16, the power split may be modified at step 126 to assign 40 percent of the total power demand to first energy storage unit 14 and the remaining 60 percent to second energy storage unit 16.

If, on the other hand, operation at the initial power split does not violate a system performance constraint function 128, power-split control technique 112 proceeds either to step 129 to determine if the power split is validated or proceeds directly to step 130 to run a power split algorithm, as described below.

In the event that the current power split was not determined as a result of running a power split algorithm, such as during a propulsion system start up where the current power split is determined from a default value, power-split control technique 112 proceeds directly from step 122 to step 130 to run a power-split algorithm that identifies an optimized power split or power allocation for the energy storage units 14, 16. In the exemplary embodiment described herein, the power-split algorithm is a multi-objective optimization algorithm that identifies an optimal vector of power split coefficients that provides an optimized tradeoff between the deterioration of the energy storage units 14, 16 and the maximization of the performance of the propulsion system 10, as described in detail below. In alternative embodiments, the power split algorithm may be a simplified filter-based algorithm, a rule-based or logic-based algorithm, or an algorithm based on one or more look-up tables.

According to various embodiments of the invention, the multi-objective optimization algorithm interfaces with the nonlinear models that define the energy storage system 12, such as, for example, models for the efficiency of the propulsion system power electronics and the overall efficiency of the power train of the propulsion system 10. The multi-objective optimization algorithm manipulates the inputs of the nonlinear models, such as time variable performance requirement, device current and voltages, switching frequency, power factors, and the like, in order to achieve the desired model and system outputs, including a desired operating efficiency, fuel economy, and maximized power output and minimized changes in the state of health (SOH) of the energy storage units 14, 16 subject to the operational constraints of the propulsion system 10.

The multi-objective optimization algorithm incorporates different methods of optimization according to various embodiments. As one non-limiting example, evolution algorithms that incorporate optimization techniques may be used to simulate natural evolutional processes. Such evolution algorithms are robust to non-smooth, non-linear, and multi-modal transfer function relationships. Alternatively, gradient-decent optimization techniques suitable for smooth and unimodal transfer function relationships may be applied. As yet another exemplary embodiment, the optimization algorithm maybe simplified as high-low pass filter based, rule/logics based, or look-up table based to reduce computational demand and simplify real-time implementation.

In operation, the multi-objective optimization algorithm probes the various nonlinear models of the energy storage system 12 to identify a Pareto-optimal set of input-output vector tuples that satisfy the operational constraints of the energy storage system 12. Each input-output tuple corresponds to an input vector of power split ratios, and an output vector of metrics such as change in the state of health (SOH) of the energy storage units 14, 16 of the energy storage system 12, change in the state of charge (SOC) of the energy storage units 14, 16 of the energy storage system 12, and the available reserve peak performance of the energy storage units 14, 16 of the energy storage system 12. The Pareto-optimal input-output tuples reside on the Pareto or efficient frontier of solutions, and are mutually and equally good tradeoff solutions in the absence of further decision-making information.

The multi-objective optimization algorithm uses a decision-making function to perform an automated selection of a specific Paereto-optimal power-split strategy to be deployed as a reference command that defines a power split for the energy storage units 14, 16. The decision-making function is based on a heuristic model that is self adjusted or corrected and that predicts the power and energy needs of the propulsion system 10 for a predetermined number of future time steps. The multi-objective optimization algorithm superimposes the decision-making function on the Pareto-optimal set of power split strategies to filter and identify an optimal power split strategy that optimizes the vehicle system's performance and health over the future time steps.

After running the multi-objective optimization algorithm at step 130, power-split control technique 112 begins an operating loop that tests and validates the power split output by the multi-objective optimization algorithm. As illustrated in FIG. 5, the power-split control technique 112 returns to step 120 and determines the impact of the new power split from the degradation models, in a similar manner as described above with respect to the initial power split. Power-split control technique 112 then proceeds to step 122 and determines whether operating according to the new power split violates any system constraint functions.

If at step 122, power-split control technique 112 determines that the new power split does violate a system constraint function 124, the power split is modified at step 126. According to one embodiment, power-split control technique 112 may modify the power split by an incremental value, such as by decreasing the usage of one of the energy storage unit by a certain percentage and increasing the usage of the another energy storage unit to generate the remainder of the desired power output. Alternatively, power-split control technique 112 may rerun the multi-objective optimization algorithm to generate a new power split, this time applying different weights to the non-linear models.

If the new power split does not violate any system constraints 128, power-split control technique 112 proceeds to step 129 and determines whether the current power split has been validated. During this step, the change in the state-of-health, $\Delta SOH$, and change in the state-of-charge, $\Delta SOC$, resulting from the current power split are assessed to determine if the current power split will cause to great of an impact on the state-of-health and/or state-of-charge of the energy storage system. In one embodiment, the change in the state-of-health, $\Delta SOH$, and change in the state-of-charge, $\Delta SOC$, may be compared to respective predefined thresholds.

If either of the change in the state-of-health, $\Delta SOH$, and the change in the state-of-charge, $\Delta SOC$, exceeds a threshold, then the current power split has not been validated 131. In this situation, the power-split control technique 112 applies the multi-objective optimization algorithm again at step 130 and the power-split control technique 112 continues to iteratively adjust the power split running through a loop defined between steps 120, 122, 129, and 130.

If, at the end of a predetermined number of iterations, power-split control technique 112 determines that the most recent iteration of the power split derived from the multi-objective optimization algorithm does not violate the system constraint functions 128 and the power split has been validated 133, power-split control technique 112 proceeds to optional step 135 (shown in phantom) as described below.

In one embodiment, the multi-objective optimization algorithm may output multiple possible power splits at step 130 during a single iteration. For example, during a given iteration the multi-objective optimization algorithm may output a first power split stated to achieve ten years of life for 85% of the customers and a second power split stated to achieve nine years of life for 95% of the customers. Assuming each of these multiple power splits does not violate a system constraint function at step 122 and has been validated at step 129, the power-split control technique 112 determines which of these power split strategies to employ using trade-off decision making at step 135. This trade-off decision making may be an automated process based on predetermined weighting of different factors and or predetermined thresholds for those factors or be determined based on a user selection. In an alternative embodiment, the trade-off decision making may be incorporated as part of the multi-objective optimization algorithm at step 130.

Following the trade-off decision making of step 135, power-split control technique 112 proceeds to step 134 and outputs a power allocation of the energy storage units to the controller 64. The power allocation corresponds to the most recent iteration of the power split and indicates how the total power demand is to be divided up between the energy storage units. Controller 64 implements the power allocation via appropriate control commands to first and second bi-directional DC-DC converters 26, 28.

Power-split control technique 112 is periodically repeated during real-time operation of the propulsion system 10. According to various embodiments, the frequency with which power-split control technique 112 is used to define new power splits may be determined as a function of time, changing operating conditions of the vehicle, a changing state of the energy storage system, or a combination thereof.

Optimized operation of a propulsion system for a hybrid or electric vehicle may also be achieved by dynamically regulating the voltage of the DC bus 36. While the dynamic regulation technique is described below with respect to propulsion system 10 of FIG. 1, it is contemplated that the technique may be extended to control the DC link voltage(s) of alternative propulsion system configurations, such as, for example, propulsion system 78 (FIG. 2) or propulsion system 92 (FIG. 3). In one embodiment, the dynamic DC bus voltage regulation is carried out simultaneously with the above-described power-split control technique 112. In yet another embodiment, the dynamic DC bus voltage regulation may be carried-out independently without the above-described power split control technique 112.

Figure 6:
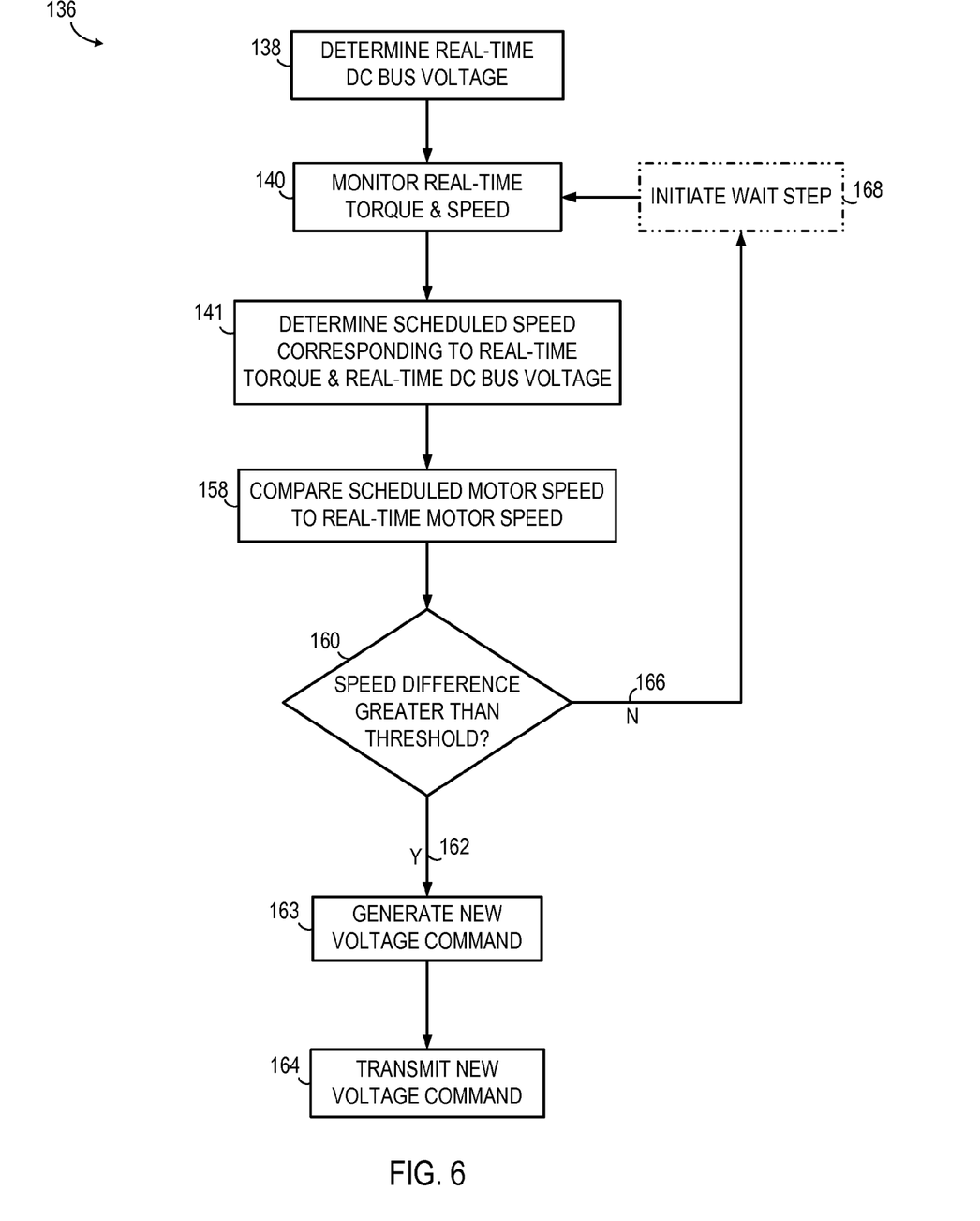
FIG. 6 illustrates a dynamic control technique for regulating a DC bus voltage a vehicle propulsion system according to an embodiment of the invention.

Referring now to FIG. 6, and with continued reference to the elements of FIG. 1 where appropriate, a dynamic voltage control technique 136 for regulating the DC bus voltage of propulsion system 10 is set forth. In addition to controlling the power split between the energy storage units 14, 16 of energy storage system 12, controller 64 also dynamically controls the DC link voltage of the DC bus 36 accordingly so that propulsion system 10 can approach its optimal efficiency during operation. As described in detail below, controller 64 monitors a DC voltage of the DC bus 36 and computes an optimal voltage command for each time step of operation and continually transmits the voltage commands to the first and second bi-directional DC-DC converters 26, 28 via control lines 66.

At step 138, the dynamic voltage control technique 136 determines the real-time voltage of the DC bus either through a measurement received from voltage sensor 38 or by accessing the previous DC bus voltage command transmitted by controller 64 to first bi-directional DC-DC converters 26, 28. This previous DC bus voltage command may be an initial voltage command transmitted upon startup of the propulsion system 10 or the voltage command transmitted during a previous time step during real-time operation of propulsion system 10.

Dynamic voltage control technique 136 accesses the real-time torque and real-time speed values of first and second electromechanical devices 46, 50 at step 140. Using the real-time torque the real-time DC bus voltage, dynamic voltage control technique 136 identifies a corresponding scheduled speed at step 141.

Figure 7:
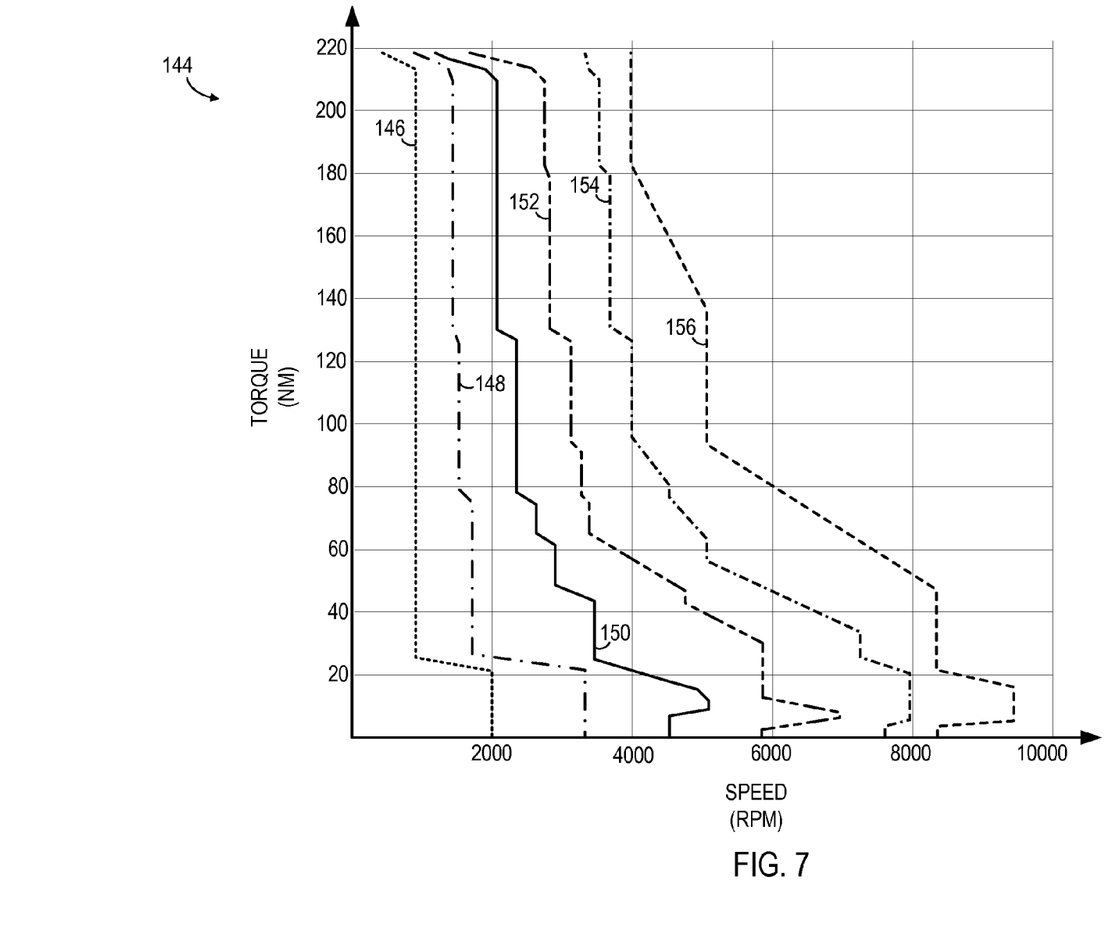
FIG. 7 is an exemplary voltage scheduling map for use with the dynamic control technique of FIG. 6.

According to one embodiment, the scheduled speed corresponding to the real-time torque and real-time DC bus voltage is determined from a voltage scheduling look-up table indexed by measured torque of the electromechanical device and DC bus voltage. In one embodiment, the voltage scheduling look-up table is generated from a voltage scheduling map, such as, for example, voltage scheduling map 144 illustrated in FIG. 7, which is a contour plot of the optimal voltage generated for a mesh grid of torque and speed of the electromechanical device. As one skilled in the art will recognize, FIG. 7 is shown for illustration purposes as a single quadrant, i.e., optimal voltage for positive torque and positive speed. However, the contour plot used for control purposes would include four quadrants, i.e., both positive and negative torque and positive and negative speed. The voltage scheduling map defines optimal DC bus voltages over a range of operating torques and operating speeds for a particular electromechanical device. As shown in FIG. 7, the voltage scheduling map 144 includes a number of operating curves 146, 148, 150, 152, 154, 156 corresponding to different DC bus voltage levels, such as, for example 250 V, 350 V, 450 V, 550 V, 650 V, and 700 V, for operating a particular electromechanical device. Given a pair of inputs of motor torque and speed, the voltage scheduling look-up table generated from the voltage scheduling map 144 may be used to identify an optimal DC voltage for the vehicle propulsion system under which the system loss is minimal. As one example, if the real-time DC bus voltage is 250 V and the real-time torque is 20 Nm, the scheduled speed would be determined to be 2000 rpm at step 141 based on the voltage scheduling map 146.

At step 158, the real-time operating speed of the electromechanical device is compared to the scheduled speed of the electromechanical device as determined at step 141. Dynamic voltage control technique 136 next determines whether the difference between the scheduled speed and the real-time operating speed of the electromechanical device is greater than a threshold at step 160. If the difference between the scheduled speed and real-time operating speed is greater than a threshold value 162, a new voltage command is generated at step 163.

At step 163, dynamic voltage control technique 136 determines the new voltage command value from a voltage scheduling look-up table generated from the voltage scheduling map 144 and based on the real-time torque and real-time speed values for the electromechanical device. Following the above-described example with a scheduled speed of 2000 RPM, torque of 20 Nm, and DC bus voltage of 250 V, if the real-time speed has increased from 1500 RPM to 2500 RPM, dynamic voltage control technique 136 will generate a new voltage command at step 163 to cause the DC bus voltage to shift up to a higher voltage level such as 350 V (corresponding to curve 148). If the real-time operating point of the electromechanical device, as determined from the real-time torque and real-time speed values, does not fall on one of the operating curves of the voltage scheduling map 144, the voltage command value may be determined by linear interpolation or by selecting the closest operating curve to the real-time operating point.

The new voltage command generated at step 163 is transmitted to the first and second bi-directional DC-DC converters 26, 28 at step 164 thereby causing the voltage on the DC bus to shift either up or down in accordance with the new voltage command. In the above-described example, the voltage on the DC bus is controlled to shift up and down by a predefined voltage interval, such as, for example, in 50 V or 100 V steps. However, alternative embodiments may generate voltage commands that shift the voltage of the DC bus in larger or smaller steps.

If, on the other hand, the difference between the scheduled speed and the real-time operating speed of the electromechanical device is not greater than the threshold value 166, dynamic voltage control technique 136 returns to step 140 after initiating an optional wait step 168 (shown in phantom).

In propulsion system embodiments that include multiple electromechanical devices, a separate voltage scheduling map is generated for each electromechanical device. In one embodiment, the voltage scheduling map is empirically derived for each electromechanical device offline. For propulsion systems having multiple electromechanical devices coupled to independent DC buses, such as the embodiments illustrated in FIGS. 2 and 3, individual voltage commands are generated in the manner described with respect to steps 138-168 of dynamic voltage control technique 136 and used to independently control the voltage on each DC bus. Alternatively, where the electromechanical devices are coupled to a common DC bus, such as the embodiment illustrated in FIG. 1, voltage commands are generated in the manner described with respect to steps 138-168 of dynamic voltage control technique 136 and then fused together into a voltage command to control the voltage on the DC bus.

In one embodiment, the individual voltage commands for each electromechanical device are combined using voting logic, which may define the fused voltage command as the median or mode of the voltages from each of the individual voltage commands. In another embodiment, the fused voltage command is determined using weighting logic that weights each of the individual voltage commands with a weighting number between 0 and 1. The weighting number for each electromechanical device is selected as an index of how much the varying voltage impacts the overall operating efficiency of the propulsion system. Weighting numbers may be determined based on one or more known operating parameters of the electromechanical device, such as maximum power, maximum efficiency, and high efficiency range. In such an embodiment, electromechanical devices with high power output, low efficiency, and narrow efficiency ranges will be given high index values or weighting numbers. Alternatively, weighting numbers may be determined dynamically based on real-time operating conditions of the electromechanical device. In this case, the weighting number for an electromechanical device would be determined specific to a particular voltage level and may vary with adjustments to the scheduled voltage of the DC bus.

Dynamic DC link voltage control technique 136 includes logic to prevent the transmission of voltage commands that would cause undesirable fluctuations in the DC bus voltage during operation thereby making dynamic control technique 136 robust to noise. To accomplish this dynamic control technique 136 implements a new voltage command only when the change in the real-time speed of the electromechanical device between consecutive iterations exceeds a predetermined threshold value.

As described above, embodiments of the invention utilize offline and online optimization techniques for designing and operating vehicle propulsion systems for electric vehicles and hybrid electric vehicles. The offline optimization technique determines a design configuration for an energy storage system of a vehicle propulsion system that minimizes size of the energy storage units within the energy storage system while providing a design configuration that achieves desired system constraints, such as maximum power output and desired years of life. To further maximize the life span of the energy storage units provided within a given energy storage system, an online optimization technique is described herein that adjusts a power split between the energy storage units during operation of the vehicle propulsion system to achieve a total power demand of the propulsion system while monitoring the state of charge and state of health of the energy storage units. Embodiments of the invention also utilize an online voltage regulation technique that dynamically controls the voltage of the DC bus based on the speed of the electromechanical devices and a predetermined voltage scheduling map specific to each electromechanical device. As described above, these online and offline techniques improve the overall system performance and efficiency while optimizing the lifespan of the energy storage units and reducing the overall manufacturing cost of the vehicle propulsion system.

One skilled in the art will appreciate that controller 64 may be implemented via a plurality of components such as one or more of electronic components, hardware components, and/or computer software components. These components may include one or more tangible computer readable storage media that generally stores instructions such as software, firmware and/or assembly language for performing one or more portions of one or more implementations or embodiments. Examples of a tangible computer readable storage medium include a recordable data storage medium and/or mass storage device. Such tangible computer readable storage medium may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of tangible computer readable storage media not listed may be employed with embodiments of the invention.

A number of such components can be combined or divided in an implementation of the systems described herein. Further, such components may include a set and/or series of computer instructions written in or implemented with any of a number of programming languages, as will be appreciated by those skilled in the art.

A technical contribution for the disclosed apparatus is that it provides for a controller implemented technique for controlling a bi-directional DC-DC converter to shift a voltage of a DC bus based on a comparison between the real-time operating speed of an electromechanical device and a scheduled speed of the electromechanical device.

According to one embodiment of the invention, a vehicle propulsion system includes a first bi-directional DC-DC converter coupled to a first DC bus, an energy storage system comprising at least one energy storage unit coupled to the first bi-directional DC-DC converter, a first DC-to-AC inverter coupled to the first DC bus, and a first electromechanical device coupled to the first DC-to-AC inverter. A controller is programmed to determine a real-time operating speed of the first electromechanical device, compare the real-time operating speed of the first electromechanical device to a scheduled speed of the first electromechanical device, and selectively control the first bi-directional DC-DC converter to shift a voltage of the first DC bus based on the comparison.

In accordance with another embodiment of the invention, a method of manufacturing a vehicle propulsion system includes providing a DC-DC converter, coupling an energy storage system to the DC-DC converter, coupling the DC-DC voltage converter to a DC bus, and coupling a first DC-to-AC inverter to the DC bus. The method also includes coupling a first electromechanical device to the DC-to-AC inverter and coupling a controller to the DC-DC converter and to the first DC-to-AC inverter. Further, the method includes configuring the controller to monitor a real-time speed of the first electromechanical device, determine a scheduled speed of the first electromechanical device, calculate a difference between the scheduled speed and the real-time speed, and if the calculated difference exceeds a threshold, control the DC-DC converter to shift a voltage of the DC bus from a first voltage level to a second voltage level different from the first voltage.

In accordance with yet another embodiment of the invention, a non-transitory computer readable storage medium has a computer program stored thereon and represents a set of instructions that when executed by a computer causes the computer to monitor a real-time speed of a first electromechanical device coupled to a DC bus through an DC-to-AC inverter and determine a scheduled speed of the first electromechanical device. The instructions also cause the computer to compare the real-time speed of the first electromechanical device to the scheduled speed of the first electromechanical device, control a bi-directional DC-DC converter to transfer power from an energy storage system to the DC bus, and control the bi-directional DC-DC converter to selectively adjust a voltage of the DC bus based on the comparison of the real-time speed of the first electromechanical device to the scheduled speed of the first electromechanical device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle propulsion system comprising:
   a first bi-directional DC-DC converter coupled to a first DC bus;
   an energy storage system comprising at least one energy storage unit coupled to the first bi-directional DC-DC converter;
   a first DC-to-AC inverter coupled to the first DC bus;
   a traction motor coupled to the first DC-to-AC inverter; and
   a controller programmed to:
      determine a real-time operating speed of the traction motor;
      compare the real-time operating speed of the traction motor to a scheduled speed of the traction motor; and
      selectively control the first bi-directional DC-DC converter to shift a voltage of the first DC bus based on the comparison to control the speed of the traction motor.

2. The vehicle propulsion system of claim 1 wherein the controller is further programmed to:
   determine if a difference between the real-time speed and the scheduled speed of the traction motor exceeds a threshold; and
   if the difference exceeds the threshold, control switching of the first bi-directional DC-DC converter based on the voltage command.

3. The vehicle propulsion system of claim 1 wherein the controller is further programmed to shift the voltage of the first DC bus by a predetermined voltage interval.

4. The vehicle propulsion system of claim 1 wherein the controller is further programmed to shift the voltage of the first DC bus to a new voltage determined from a voltage scheduling look-up table for the traction motor.

5. The vehicle propulsion system of claim 4 wherein the controller is further programmed to:
   determine a real-time torque of the traction motor;
   determine a real-time voltage of the first DC bus;
   determine the scheduled speed from the voltage scheduling look-up table based on the real-time torque and the real-time voltage of the first DC bus;
   determine the new voltage from the voltage scheduling look-up table based on the real-time torque and the real-time operating speed; and
   control the first bi-directional DC-DC converter to shift the voltage of the first DC bus to the new voltage.

6. The vehicle propulsion system of claim 1 wherein the controller is further programmed to determine the scheduled speed of the traction motor using a voltage scheduling look-up table indexed by measured torque and DC voltage.

7. The vehicle propulsion system of claim 1 further comprising:
   a second DC-to-AC inverter coupled to the first DC bus; and
   a second motor coupled to the second DC-to-AC inverter.

8. The vehicle propulsion system of claim 7 wherein the controller is further programmed to:
   generate a first voltage command from a predefined voltage scheduling map for the traction motor;
   generate a second voltage command from a predefined voltage scheduling map for the second motor;
   combine the first voltage command and the second voltage command;
   generate a fused voltage command from the combination; and
   selectively control switching of the first bi-directional DC-DC converter to shift the voltage of the first DC bus based on the fused voltage command.

9. The vehicle propulsion system of claim 8 wherein the controller is further programmed to combine the first voltage command and the second voltage command using one of voting logic and weighting logic.

10. The vehicle propulsion system of claim 1 further comprising:
    a second bi-directional DC-DC converter coupled to a second DC bus;
    a second DC-to-AC inverter coupled to the second DC bus; and
    a second motor coupled to the second DC-to-AC inverter; and
    wherein the controller is further programmed to:
       generate a first voltage command from a predefined voltage scheduling map for the traction motor;
       generate a second voltage command from a predefined voltage scheduling map for the second motor;
       selectively control switching of the first bi-directional DC-DC converter to shift the voltage of the first DC bus based on the first voltage command; and
       selectively control switching of the second bi-directional DC-DC converter to shift the voltage of the second DC bus based on the second voltage command.

11. A method of manufacturing a vehicle propulsion system, the method comprising:
    providing a DC-DC converter;
    coupling an energy storage system to the DC-DC converter;
    coupling the DC-DC voltage converter to a DC bus;
    coupling a first DC-to-AC inverter to the DC bus;
    coupling a traction motor to the DC-to-AC inverter;
    coupling a controller to the DC-DC converter and to the first DC-to-AC inverter; and
    configuring the controller to:
       monitor a real-time speed of the traction motor;
       determine a scheduled speed of the traction motor;
       calculate a difference between the scheduled speed and the real-time speed; and
       if the calculated difference exceeds a threshold, control the DC-DC converter to shift a voltage of the DC bus from a first voltage level to a second voltage level different from the first voltage to control the speed of the traction motor.

12. The method of claim 11 further comprising configuring the controller to control the DC-DC voltage converter to shift the voltage of the DC bus by a predefined voltage interval.

13. The method of claim 12 further comprising configuring the controller to control the DC-DC converter to:
increase the voltage of the DC bus by the predefined voltage interval if the scheduled speed of the traction motor is less than the real-time speed of the traction motor; and
decrease the voltage of the DC bus by the predefined voltage interval if the scheduled speed of the traction motor is greater than the real-time speed of the traction motor.

14. The method of claim 11 further comprising:
coupling a second DC-to-AC inverter to the DC bus;
coupling a second motor to the second DC-to-AC inverter; and
configuring the controller to:
monitor a real-time speed of the second motor;
determine a scheduled speed of the second device motor;
calculate a difference between the scheduled speed and the real-time speed of the second motor; and
if the calculated difference exceeds a threshold, control the DC-DC converter to shift the voltage of the DC bus.

15. The method of claim 11 further comprising configuring the controller to:
monitor a real-time torque of the traction motor;
access a voltage-scheduling look-up table for the traction motor; and
define the second voltage level from the voltage-scheduling look-up table based on the real-time torque of the traction motor and the real-time speed of the traction motor.

16. A non-transitory computer readable storage medium having a computer program stored thereon and representing a set of instructions that when executed by a computer causes the computer to:
monitor a real-time speed of a traction motor coupled to a DC bus through an DC-to-AC inverter;
determine a scheduled speed of the traction motor;
compare the real-time speed of the traction motor to the scheduled speed of the traction motor;
control a bi-directional DC-DC converter to transfer power from an energy storage system to the DC bus; and
control the bi-directional DC-DC converter to selectively adjust a voltage of the DC bus based on the comparison of the real-time speed of the traction motor to the scheduled speed of the traction motor to control the speed of the traction motor.

17. The non-transitory computer readable storage medium of claim 16 wherein the instructions further cause the computer to step the voltage of the DC bus up or down by a predefined voltage interval.

18. The non-transitory computer readable storage medium of claim 16 wherein the instructions further cause the computer to:
cause the bi-directional DC-DC converter to decrease the voltage of the DC bus by a predefined step if the real-time speed of the traction motor is less than the scheduled speed of the traction motor; and
cause the bi-directional voltage converter to increase the voltage of the DC bus by the predefined step if the real-time speed of the traction motor is greater than the scheduled speed of the traction motor.

19. The non-transitory computer readable storage medium of claim 16 wherein the instructions further cause the computer to:
access a database comprising a voltage scheduling look-up table for the traction motor; and
determine the scheduled speed of the traction motor from the voltage scheduling look-up table.

20. The non-transitory computer readable storage medium of claim 16 wherein the instructions further cause the computer to:
monitor a real-time torque of the traction motor;
access a database comprising a predefined voltage scheduling look-up table for the traction motor; and
identify an operating point from the predefined voltage scheduling look-up table corresponding to the real-time torque of the traction motor and the real-time speed of the traction motor; and
cause the bi-directional DC-DC converter to selectively adjust the voltage of the DC bus to match a voltage corresponding to the operating point.

* * * * *